(12) United States Patent
Johansson et al.

(10) Patent No.: US 12,105,273 B2
(45) Date of Patent: Oct. 1, 2024

(54) MICROSCOPE HAVING MOVABLE MULTI-OBJECTIVE OPTICS MODULE

(71) Applicant: cytena GmbH, Freiburg (DE)

(72) Inventors: Agnes Johansson, Gothenburg (SE); Nathanael Dögel, Bahlingen am Kaiserstuhl (DE); David Rauch, Freiburg (DE); Lena Lautscham, Freiburg (DE)

(73) Assignee: CYTENA GMBH, Freiburg (DE)

( * ) Notice: Subject to any disclaimer, the term of this patent is extended or adjusted under 35 U.S.C. 154(b) by 38 days.

(21) Appl. No.: 18/079,930

(22) Filed: Dec. 13, 2022

(65) Prior Publication Data
US 2023/0194846 A1    Jun. 22, 2023

(30) Foreign Application Priority Data
Dec. 16, 2021 (LU) ........................................ 501031

(51) Int. Cl.
| | | |
|---|---|---|
| G02B 21/36 | (2006.01) | |
| G02B 21/26 | (2006.01) | |
| G02B 21/34 | (2006.01) | |

(52) U.S. Cl.
CPC ........... *G02B 21/362* (2013.01); *G02B 21/26* (2013.01); *G02B 21/34* (2013.01)

(58) Field of Classification Search
CPC ...... G02B 21/362; G02B 21/26; G02B 21/34; G02B 21/248
USPC .......................................................... 348/79
See application file for complete search history.

(56) References Cited

U.S. PATENT DOCUMENTS

| | | | | |
|---|---|---|---|---|
| 6,400,395 B1* | 6/2002 | Hoover | ................ | G02B 21/361 |
| | | | | 359/381 |
| 8,027,084 B2* | 9/2011 | Hasegawa | .......... | G02B 21/0088 |
| | | | | 359/368 |
| 8,223,428 B2* | 7/2012 | Hasegawa | ............ | G02B 21/248 |
| | | | | 359/381 |
| 2002/0001126 A1* | 1/2002 | Engelhardt | ........ | G02B 21/0072 |
| | | | | 359/368 |
| 2008/0304082 A1 | 12/2008 | Gotz et al. | | |
| 2009/0086314 A1* | 4/2009 | Namba | .................. | G02B 21/34 |
| | | | | 359/383 |

(Continued)

FOREIGN PATENT DOCUMENTS

| | | |
|---|---|---|
| DE | 10141544 A1 | 3/2003 |
| EP | 2003481 A2 | 12/2008 |

(Continued)

*Primary Examiner* — Marnie A Matt
(74) *Attorney, Agent, or Firm* — Hodgson Russ LLP

(57) ABSTRACT

A microscope comprises a housing having a receiving portion for receiving at least one biological sample, an optics module comprising several objectives and an illumination system for illuminating at least one biological sample and/or an acquiring system for acquiring light coming from at least one biological sample, wherein the optics module is arranged in an inner space of the housing. The microscope is characterized in that the microscope comprises a replacement system for replacing an objective by one of the other objectives wherein the replacement system is configured to replace the objective by means of moving the optics module relative to the housing and/or by means of moving the housing relative to the optics module.

20 Claims, 14 Drawing Sheets

(56) References Cited

U.S. PATENT DOCUMENTS

Figure 1:
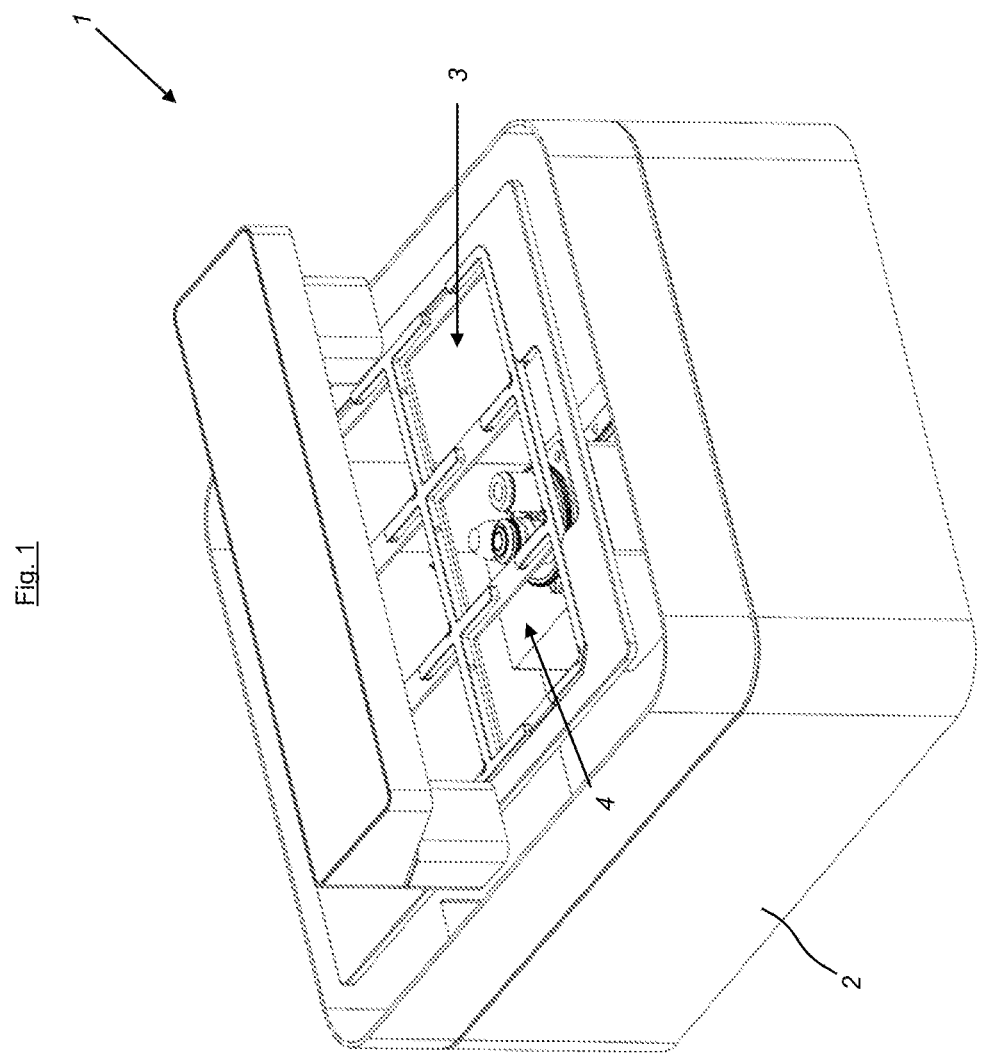

| | | | |
|---|---|---|---|
| 2011/0013275 A1* | 1/2011 | Hein | G02B 21/248 |
| | | | 359/388 |
| 2017/0205270 A1 | 7/2017 | Luedemann | |
| 2018/0231759 A1* | 8/2018 | Schacht | G02B 21/248 |
| 2020/0211233 A1* | 7/2020 | Siegel | G06F 3/013 |
| 2022/0026696 A1* | 1/2022 | Spiecker | G02B 21/0032 |
| 2023/0055333 A1* | 2/2023 | Policelli | G02B 21/06 |

FOREIGN PATENT DOCUMENTS

| | | |
|---|---|---|
| JP | 2009025373 A | 2/2009 |
| JP | 2011203694 A | 10/2011 |
| WO | 2020157077 A2 | 8/2020 |

* cited by examiner

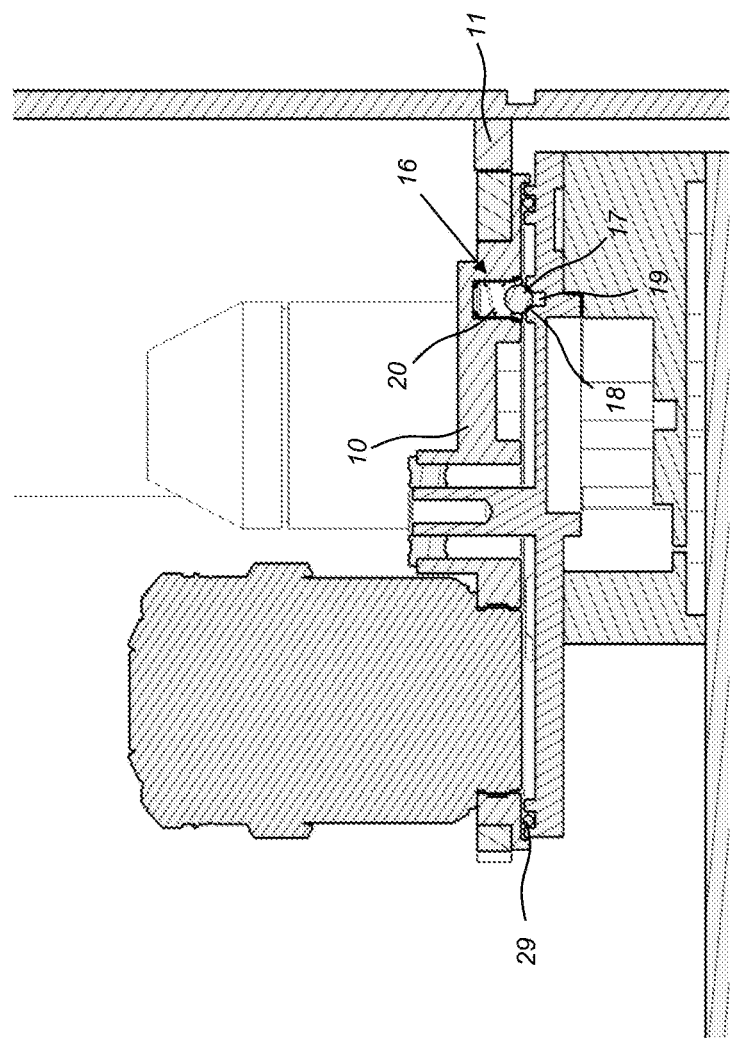

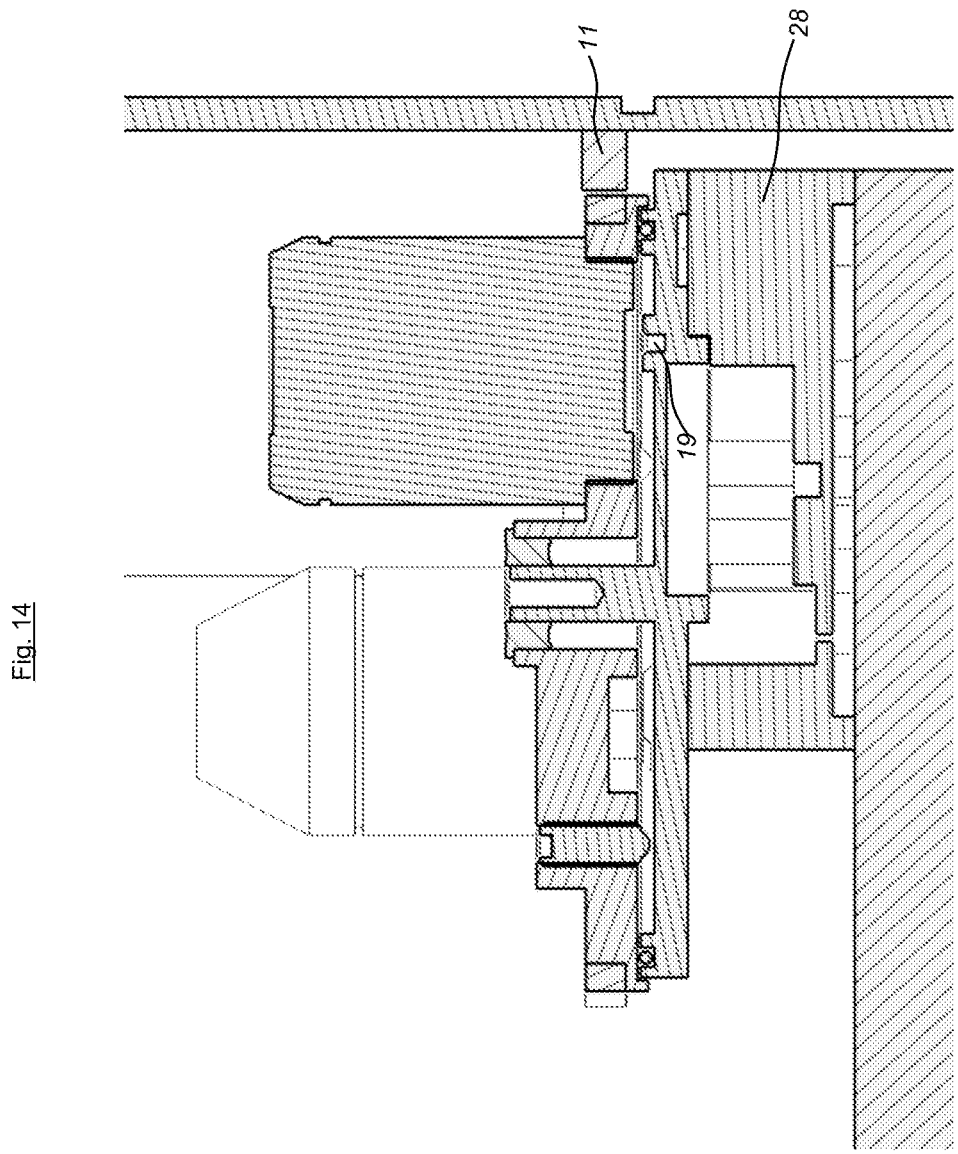

MICROSCOPE HAVING MOVABLE MULTI-OBJECTIVE OPTICS MODULE

CROSS-REFERENCE TO RELATED APPLICATIONS

The present application claims priority under 35 USC § 119 of Luxembourg Patent Application No. 501031 filed Dec. 16, 2021, the entire disclosure of which is incorporated herein by reference.

FIELD

The disclosure relates to a microscope. Additionally, the disclosure relates to a method for replacing an objective of a microscope and the use of the microscope in an incubator for biological samples.

BACKGROUND

It is known from the prior art that microscopes are used to observe biological samples, such as cells. In this context, a microscope is known that has one or more receiving portion(s) into which sample carriers with multiple containers or other substrates, such as Petri dishes, bottles, etc., can be inserted. The microscope has an optics module that can be moved in two or three spatial directions within a microscope housing by means of an axis system. In addition, the microscope has an objective lens that is screwed onto the optics module. The microscope can be placed in a cell culture incubator and cell development can be viewed using the microscope. Such a microscope is disclosed in WO 2020/157 077 A2.

The known microscope has the disadvantage that depending on the application a user needs different magnifications. This means that the user occasionally has to manually replace the mounted objective by another objective. This requires the user to access the inside of the microscope, which interferes with ongoing observations. In addition, the user must open a cell incubator for extended periods of time which may be detrimental to the cell cultures.

SUMMARY

Therefore, the object of the disclosure is to provide a microscope in which an objective can be easily changed.

The object is solved by a microscope comprising
a housing having a receiving portion for receiving at least one biological sample,
an optics module comprising several objectives and an illumination system for illuminating at least one biological sample and/or an acquiring system for acquiring light coming from at least one biological sample, wherein the optics module is arranged in an inner space of the housing, characterized in that
he microscope comprises a replacement system for replacing an objective by one of the other objectives wherein the replacement system is configured to replace the objective by means of moving the optics module relative to the housing and/or by means of moving the housing relative to the optics module.

Another object of the disclosure is to provide a method according to which an objective can be easily changed.

Said object is solved by a method for replacing an objective of a microscope, wherein the microscope comprises an optics module comprising several objectives and an illumination system for illuminating at least one biological sample and/or an acquiring system for acquiring light coming from at least one biological sample, wherein the optics module is arranged in an inner space of the housing, characterized in that the optics module moves relative to the housing for replacing an objective by one of the other objectives and/or in that the housing moves relative to the optics module for replacing an objective by one of the other objectives.

An advantage of the disclosure is that the objective can be replaced by one of the other objectives of the microscope in an automated manner without the user having access to the inner space of the housing of the microscope. Thus, the user no longer needs access to the inner space of the incubator and/or to the inner space of the housing of the microscope to exchange the objective. Therefore, the objective change is not detrimental for the biological sample to be observed by the microscope. Additionally, ongoing observations are not interfered by the objective replacement but the objective replacement can be performed automatically after the observation is finished.

The objectives of the microscope can differ in their properties from each other. In particular, the objectives can differ from one another in terms of their magnification or another optical property.

An optics module is understood to be a component unit that is moved as a whole. This means that when the optics module is moved, all components of the optics module are moved. In particular, when the optics module is moved, all components of the illumination system and/or all components of the acquiring system are moved. The objectives are part of the optics module so that the objectives are moved together with the other parts of the optics module when the optics module is moved.

The biological sample may have a liquid and/or biological particles. The biological particles may be microorganisms such as bacteria, archaean, yeast, fungi, and viruses or cells, DNA, RNA, or proteins. The biological sample may comprise a single or multiple of the aforementioned biological particles. In this regard, the fluid may be a cell suspension that can promote growth of cells disposed in the fluid. Alternatively, the particle may be a glass or polymer bead and have substantially the same volume as a cell.

The receiving portion can be configured to receive one or more sample carriers. In particular, the receiving portion can be a through hole in the housing. The sample carrier can be a substrate or comprise at least one well. In particular, the sample carrier can be a multiwell comprising a plurality of wells. Multiwells having 24, 48, 96 or more wells are already known and can be arranged in the receiving portion of the housing. The optics module can be moved to different observation positions in which the biological sample arranged on a substrate or being in a well is observed.

An observation position is a position of the objective in which the objective is used to observe the biological sample arranged in the receiving portion. The optics module can be moved to several observation positions. The number of observation positions depends on the number of biological samples to be observed. The optics module can remain in an observation position for a predetermined time.

As replacing an objective it is understood that the objective being in the observation position is replaced by one of the other objectives of the microscope. That means, after replacement of the objective, the other objective is arranged in the observation position. Both objectives change their position relative to the optics module housing.

The replacement system is a system enabling the replacement of the objective by the other objective. Such a replacement system has the advantage that no specific actuator is needed for replacing the objective and thus is considered as passive system. Thus, the optics module has low weight and has a simple structure.

For replacing the objective by one of the other objectives, it is possible to move the optics module relative to the housing, wherein the housing does not move. It is also possible to move the housing relative to the optics module, wherein the optics module does not move. Additionally or alternatively, it is possible that both the optics module and the housing move relative to each other.

According to an embodiment the objectives and/or the microscope are configured such that during the replacement the position of the objective is changed from an observation position to a storage position and/or the position of the other objective is changed from a storage position to an observation position. The storage position is a position in which the respective objective is not used for observing the biological sample. The objective being in the storage position can be moved to the observation position when the optics module moves relative to the housing and/or when the housing moves relative to the optics module. Alternatively, the objective being in the observation position is moved to a storage position when the optics module moves relative to the housing and/or when the housing moves relative to the optics module. The storage position and the observation position are distant from each other. Such a structure enables that the objective replacement can be performed by the objectives that are already arranged in the inner space of the housing. Thus, it is not necessary that that user has to access the inner space of the housing in order to replace the objective with an objective that is not arranged in the housing of the microscope but in objective storage arranged outside the microscope.

The optics module can be configured to be translatory moved in order to replace the objective by the other objective. In particular, the optics module is moved along merely one direction in order to replace the objective. The optics module can be configured that moving of the optics module results in a rotation of the objectives. The rotation axis along which the objectives are rotated can be transverse or perpendicular to a movement direction of the optics module for changing the position of the objectives. The objectives can be arranged such that a length axis of the objective is arranged in a radial distance to the rotation axis. Thus, the replacement system is configured to enable in a simple manner that a translatory movement of the optics module leads to rotation of the objectives. That means, the optics module is configured such that the objectives are moved translatory and rotated in order to replace the objective by the other objective.

The inner space of the housing can comprise a replacement section to which the optics module has to be moved for replacing the objective by the other objective. This means, an optics' module movement outside the replacement section does not lead to a rotation of the objectives and/or to a change of the objective's position. Thus, it is secured that the replacement of the objective can only occur in a specific section of the inner space, namely the replacement section.

According to an embodiment the replacement system can comprise a first gear part and a second gear part. The replacement system can be configured that the first gear part and the second gear part are engaged with each for replacing the objective by the other objective. Thus, the first gear part and the second gear part are engaged with each other when the optics module is in the replacement section of the inner space. In particular, the first gear part can be in a form-fit connection with the second gear part in order to change the position of the objective. However, the replacement system is configured that the first gear part and the second gear part are not engaged with each other when the optics module is not arranged in the replacement section of the inner space. Thus, it is secured in an easy manner that the objectives are only changed when the optics module is in the replacement section of the inner space.

The first gear part can be fixedly connected with the optics module. This means, the first gear part moves together with the optics module when the optics module is moved. However, it is possible that the first gear part moves relative to the optics module. In particular, it is possible that the first gear part can rotate relative to the optics module housing. The first gear part can be connected with an optics module housing and/or arranged on an optics module housing. By moving the optics module arranged in the replacement section the first gear part is rotated so that the position of the objective is changed from the operation position to the storage position or vice versa. It is also possible that the position of an objective is changed from a storage position to another storage position.

The objectives can be fixedly connected with the first gear part. This means, the objectives do not move, in particular rotate, relative to the first gear part so that the objectives rotate when the first gear part rotates. The objectives can be, in particular directly, arranged on the first gear part. The objectives can be connected with the first gear part in a releasable manner. Thus, the user can attach the objectives to the first gear part that are needed for the observation process of the biological sample.

The second gear part can be fixedly connected with the housing. Thus, the second gear part cannot move relative to the housing and/or to the first gear part but is designed to be stationary. In particular, the second gear part is arranged on a housing wall of the housing.

The first gear part can be gear wheel. The second gear part can be a rack. Thus, a simple change system can be provided. In particular, the replacement system can only comprise two gear parts and thus is structured in a simple manner. The replacement system is configured to use a drive device that already is provided for moving the optics module for replacing the objective by the other objective. Thus, there is no need to provide a specific drive device for replacing the objective by the other objective.

According to an embodiment the microscope can comprise a control unit. The control unit can cause that the optics module is moved to the replacement section when the position of the objective shall be changed, i.e. when the objective shall be replaced by the other objective. Additionally or alternatively, the control unit can cause that the housing is moved such that the optics module is arranged in the replacement section, when the position of the object shall be changed. Additionally, the control unit can cause that the optics module is moved by a predetermined distance for replacing the objective by the other objective. The movement of the optics module by a predetermined distance leads to that the first gear part is rotated by a predetermined angle. The predetermined angle is chosen such that an objective being arranged in the storage position can be arranged in the observation position after the first gear part is rotated.

The control unit causes that the optics module is moved to the replacement section to change the objective being in the observation position by a predetermined objective being in the storage position after the observation process is finished. Additionally or alternatively, the control unit can cause that the housing is moved to the replacement section to change the objective being in the observation position by a predetermined objective being in the storage position after the observation process is finished. Thus, it can be secured that a predetermined objective is arranged in the storage position after the observation process is finished. Therefore, the observation process can always start with the same objective and/or the objective being in the observation position is always known at the beginning of the observation process.

According to an embodiment the microscope can comprise a fixation system for keeping the first gear part in its position. For observing the biological sample it is necessary that the objective does not move, in particular does not rotate, after it is arranged in the observation position. This is secured by the fixation system in an easy manner as it is described below.

The fixation system can be configured such that the first gear part is kept in its position by means of a form-fit connection between the first gear part and the optics module housing. Alternatively or additionally, the first gear part can be kept in its position by means of a magnetic connection between the first gear part and the optics module. In the end a connection between first gear part and the optics module housing is achieved and a movement of the first gear part is prevented due to said connection.

The fixation system can comprise at least one engagement element and at least one receiving element comprising a cavity, wherein the first gear part is kept in its position when the engagement element is arranged in the cavity of the receiving element. Thus, the structure of the fixation system is kept simple.

The fixation system can comprise a plurality of engagement elements. Said engagement elements can be arranged distant to each other along a circumferential direction of the first gear part. The engagement element can have a spherical shape. In particular the engagement element can be designed as a ball. The first gear part can comprise a recess. The engagement element can be arranged in the recess. Additionally, a spring can be arranged in the recess. The spring can act on the engagement element. In particular, the spring can provide force on the engagement element that is directed towards the optics module housing. The number of engagement elements can correspond with the number of objectives.

The receiving element can protrude from the optics module housing. In particular, the receiving element can protrude from the optics module housing in a direction towards the first gear part. The fixation system can comprise a plurality of receiving elements. In particular, the number of receiving elements can correspond to the number of objectives. The receiving can be arranged distant from each other along a circumferential direction of the optics module housing. A fixation system having the aforementioned structure has the advantage that it is possible to keep the position of the objective independent which of the objectives is arranged in the observation position.

The microscope can comprise a detection device for detecting the objective that is in the operation position and/or for detecting the position of the first gear part. By detecting the position of the first gear part it can be indirectly determined which of the objectives is arranged in the observation position.

The microscope can have a drive device to move the optics module in a first and second direction. The drive device can be electrically connected with the control unit. The first and second directions are perpendicular to each other and form a plane. The plane can have a constant distance in a third dimension being perpendicular the first and second dimension to the biological sample. That means, that the distance between the optics module and the biological sample along the third dimension does not change when the optics module is moved along the first and/or second dimension. The optics module can be moved along the first and/or second dimension in order to change the position of the objective from the observation position to a storage position or vice versa. An axis system is provided for moving and guiding the optics module along the first and/or second direction.

The microscope can comprise a further drive device for moving the objective or objectives in a third direction. In particular the further drive device can move the first gear part and thus all objectives at the same time in the third dimension. The optics module housing can have a house part of the optics module housing that is moveable with respect to the remaining housing of the optics module housing. The further drive device can be coupled with the house part and move it along the third direction. The first gear part can be connected with the house part. In particular the first gear part can be arranged on the house part. The control unit can cause that the objective or objectives are moved in a third direction after the optics module is arranged in an observation position.

The acquisition system may have an image sensor. The image sensor may have three fluorescence channels. In addition, the acquisition system includes a filter, in particular an emission filter. Further, the acquisition system may include a tube lens and a steering lens for directing a detection light emitted from the biological sample. The illumination system may have one or more light sources. For example, the illumination system may have three light sources for providing blue, green, and red illumination light. The microscope may be a fluorescence microscope, such that the light source or sources provide excitation light that travels to a biological sample. Further, the illumination system may include one or more collimator lenses and one or more further filter, in particular excitation filters. In particular, the illumination system may have one collimator lens and one excitation filter per light source. The components of the acquisition system and the illumination system can be arranged in or on the optics module housing. Thus, a compact optics module is achieved.

The microscope may be an inverted microscope. Furthermore, the optics module may be designed such that an output illumination light, in particular excitation light, and a detection light received by the objective are coaxial with each other. In particular, the lights can be coaxial with each other within the objective being in the observation position. The detection light emanates from the biological sample after the biological sample is exposed to the illumination light. The illumination light is generated by the at least one light source of the illumination system.

Of particular advantage is the use of a microscope according to the disclosure in an incubator for biological samples. An incubator is a device used to create controlled outdoor conditions for various development and growth processes. Thus, a temperature and/or humidity can be controlled by means of the incubator.

BRIEF DESCRIPTION OF THE DRAWING VIEWS

Figure 2:
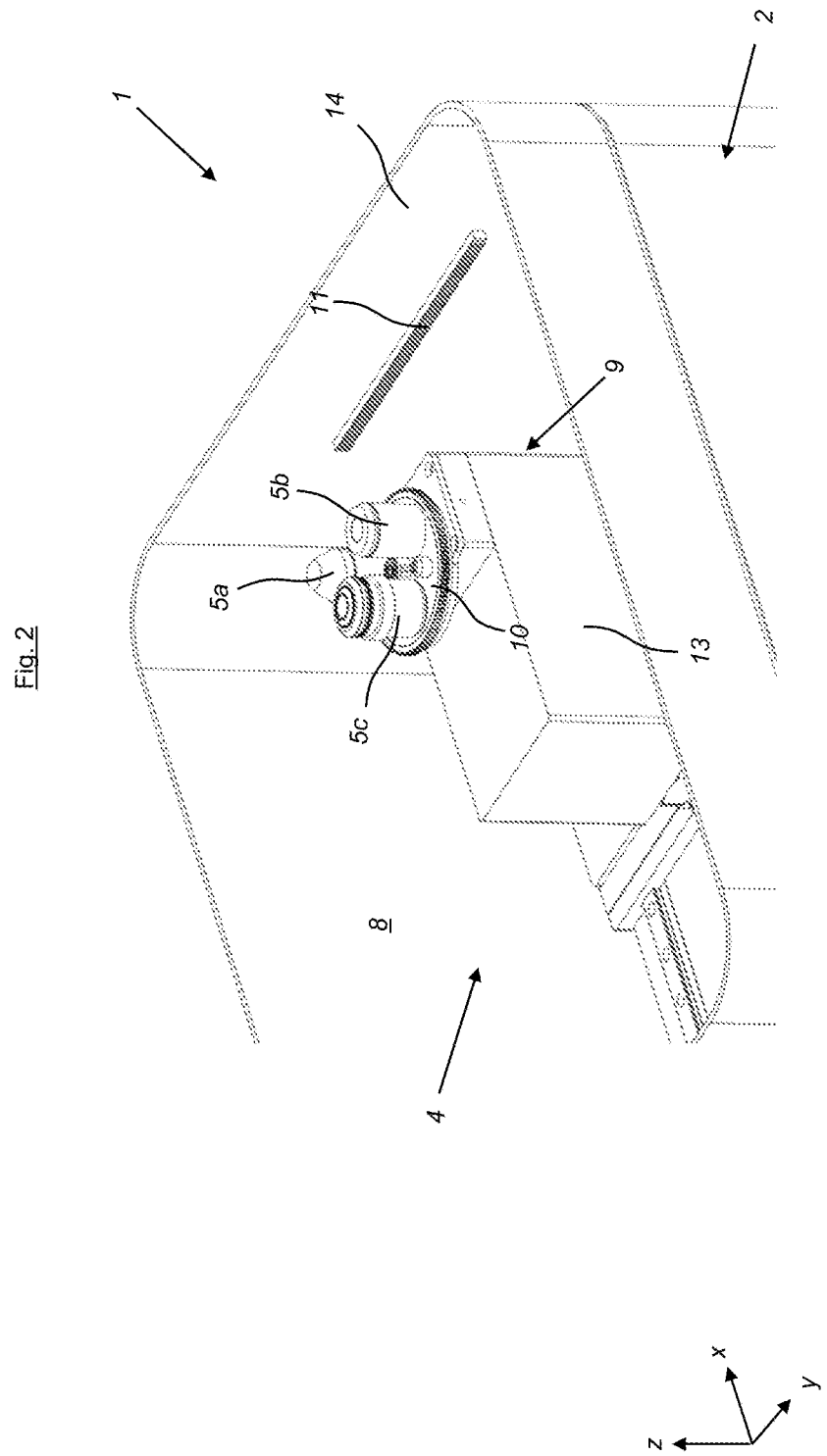
Figure 3:
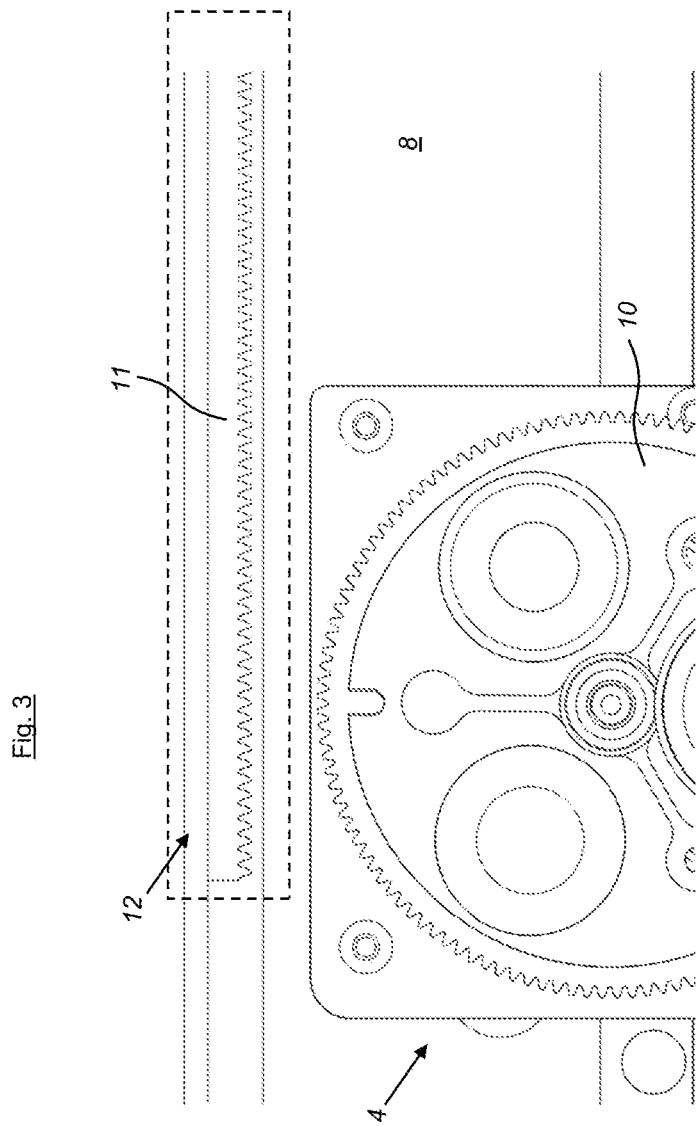
Figure 4:
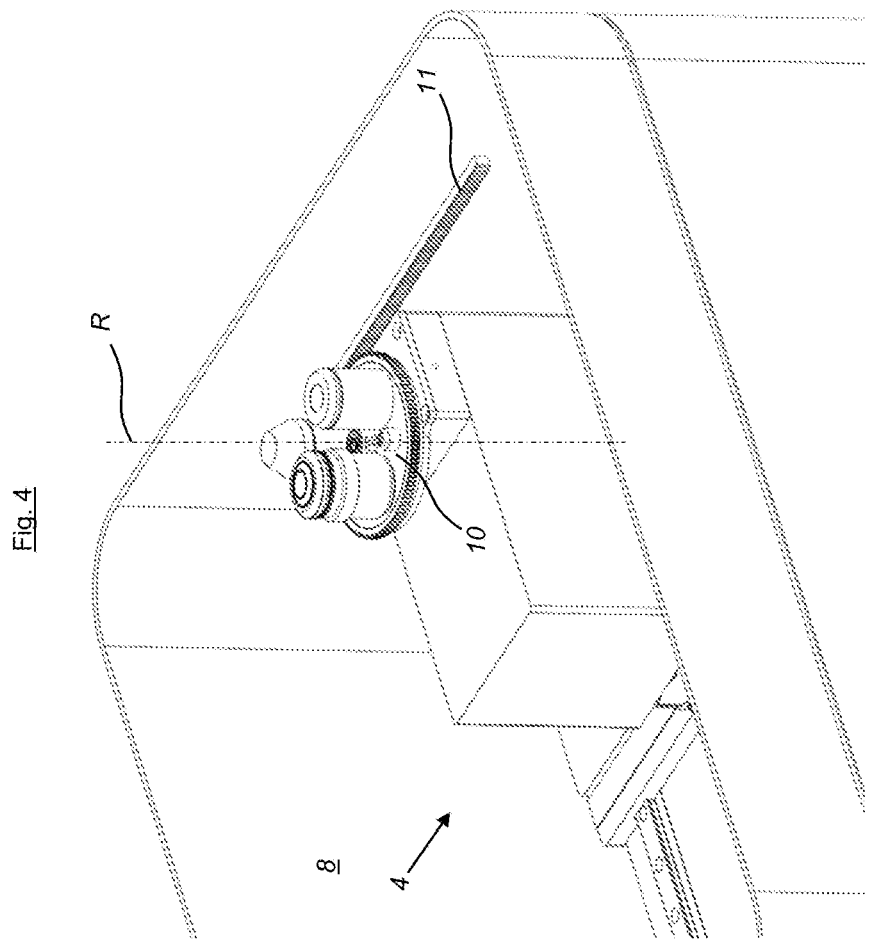
Figure 5:
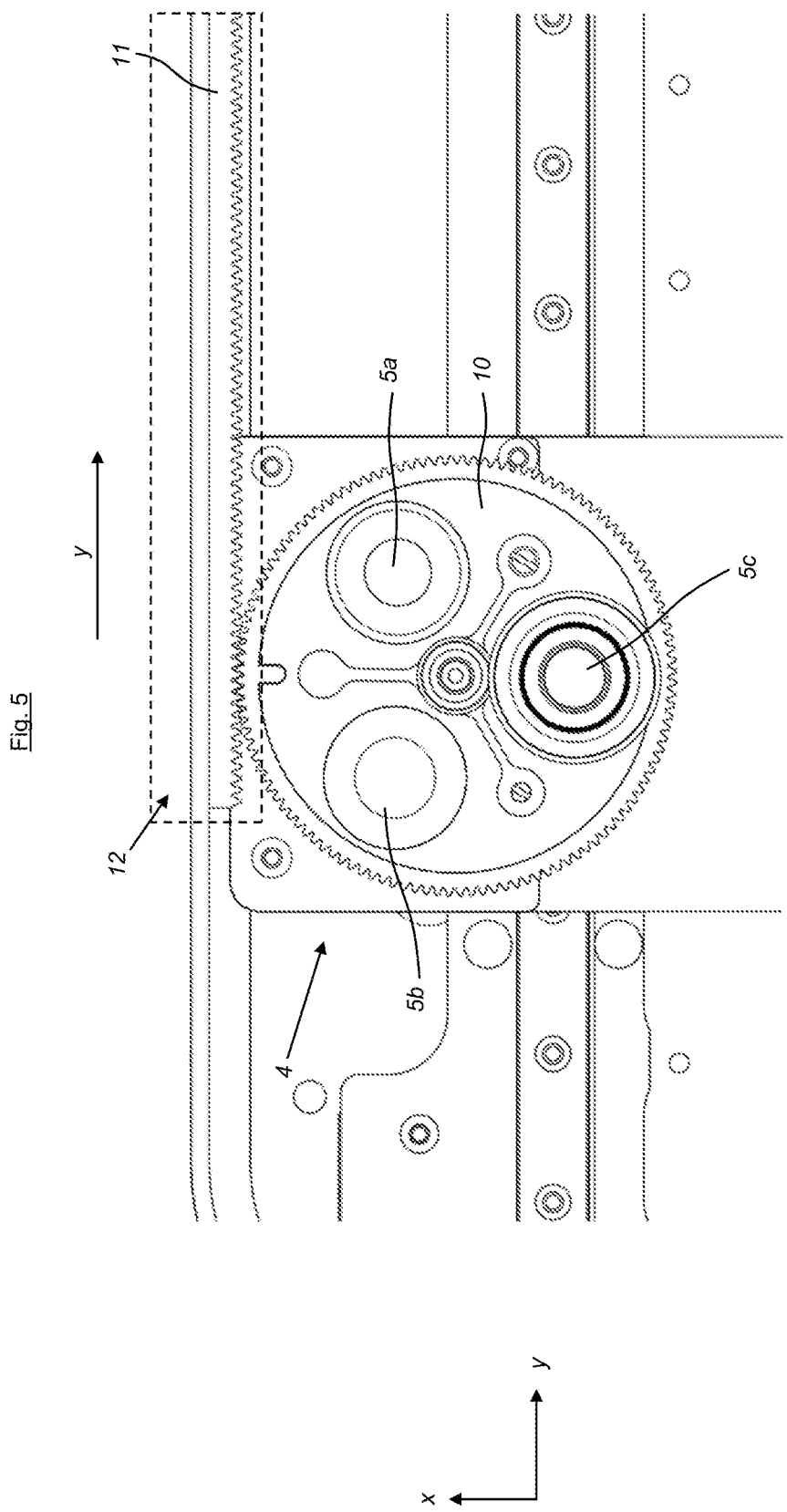
Figure 6:
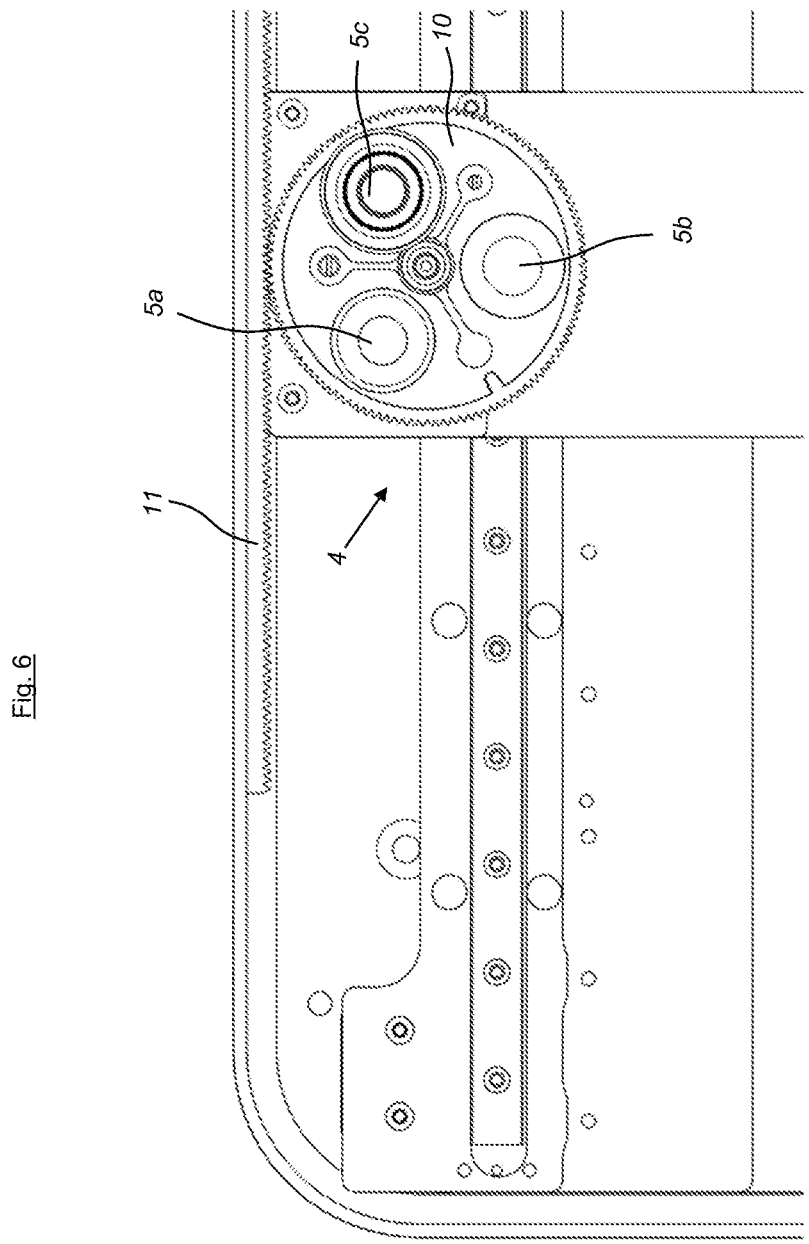
Figure 7:
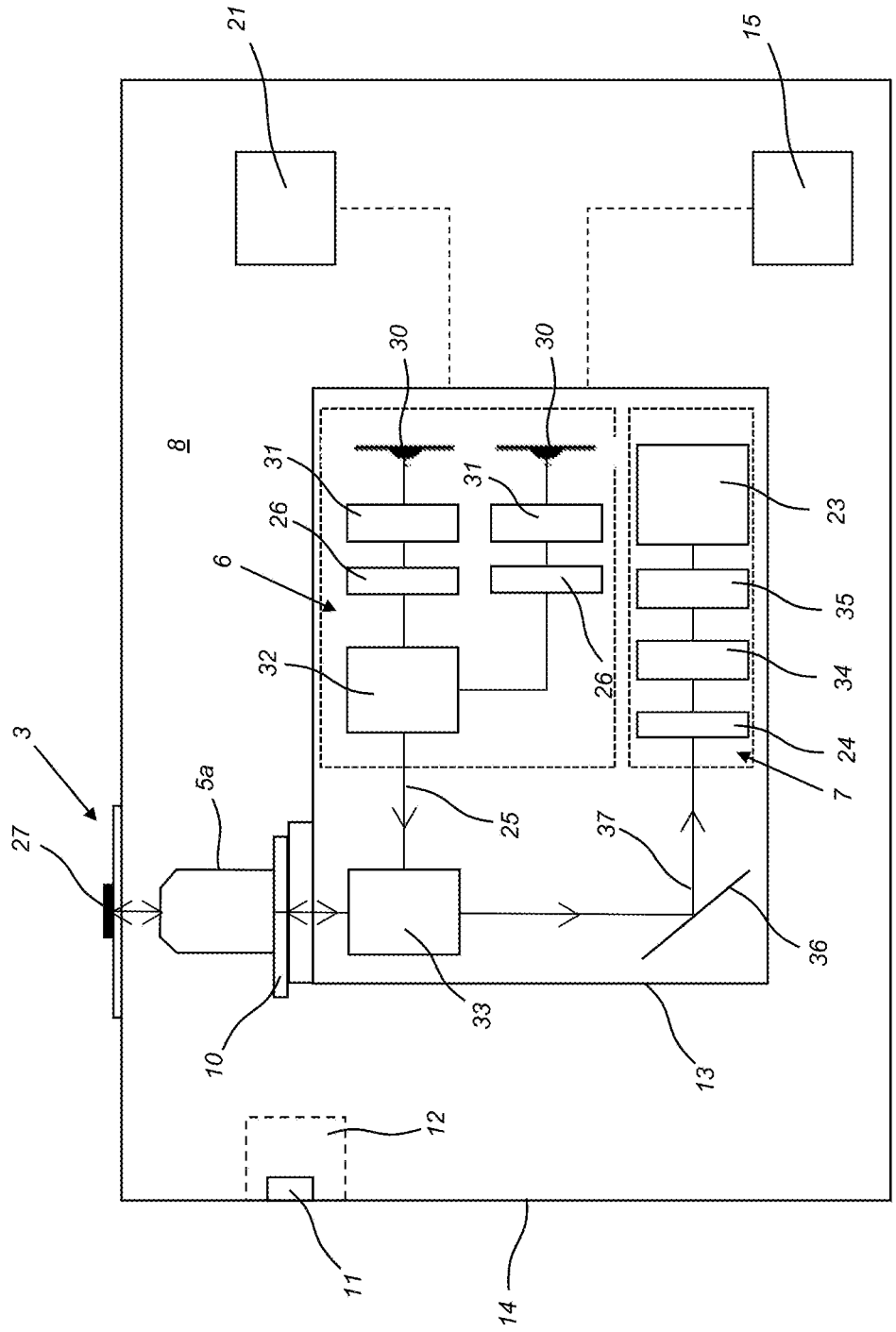
Figure 8:
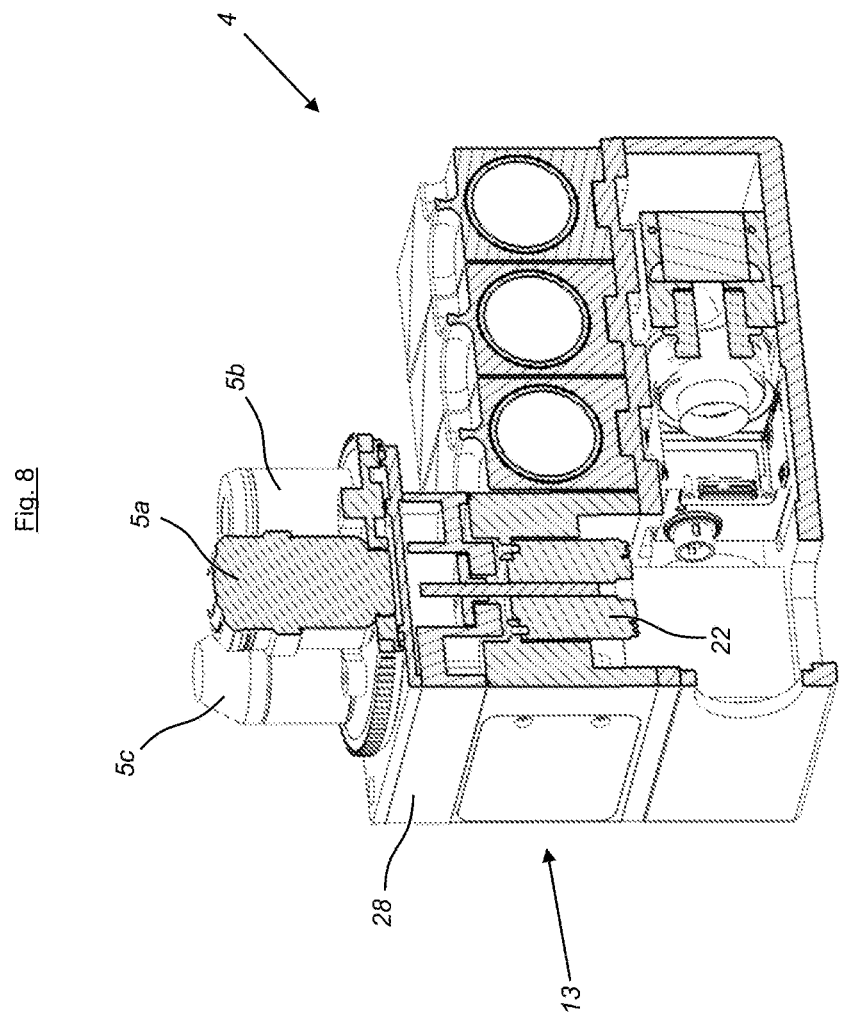
Figure 9:
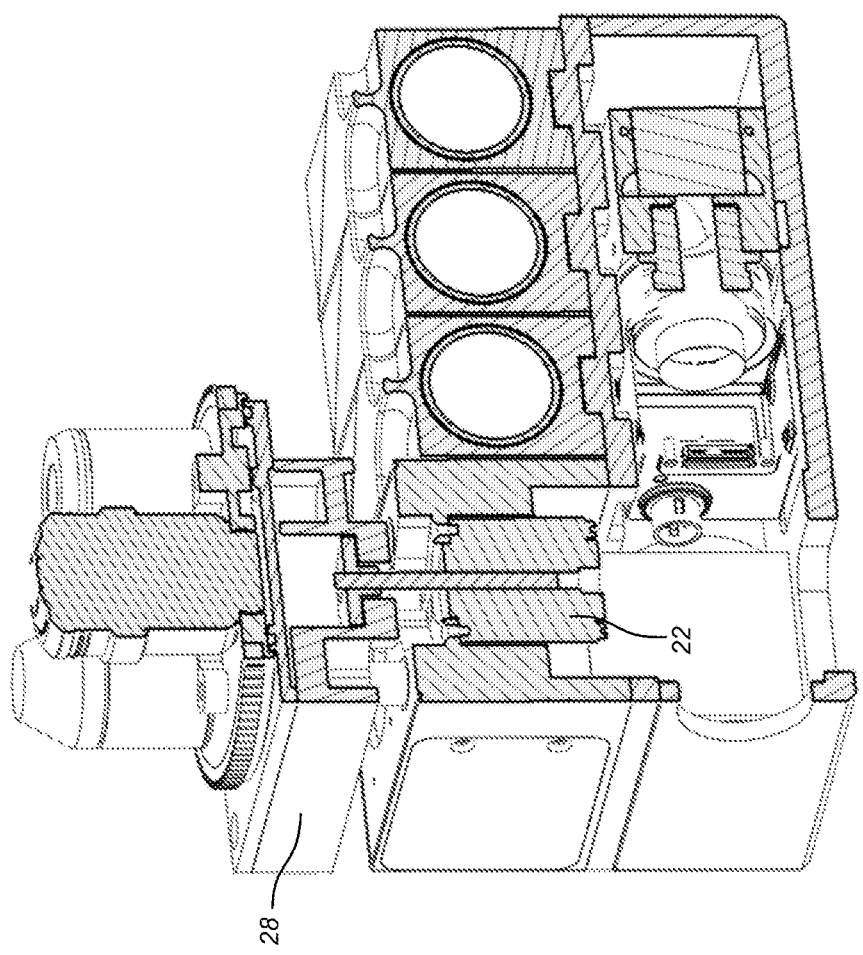
Figure 10:
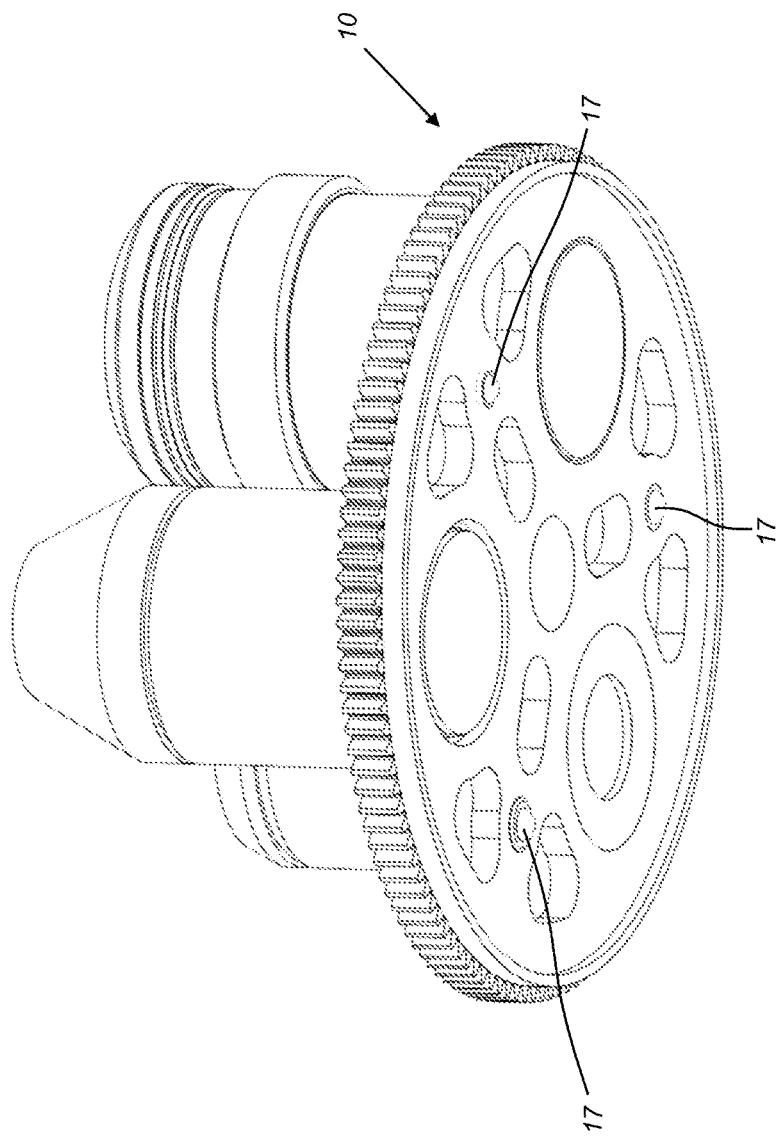
Figure 11:
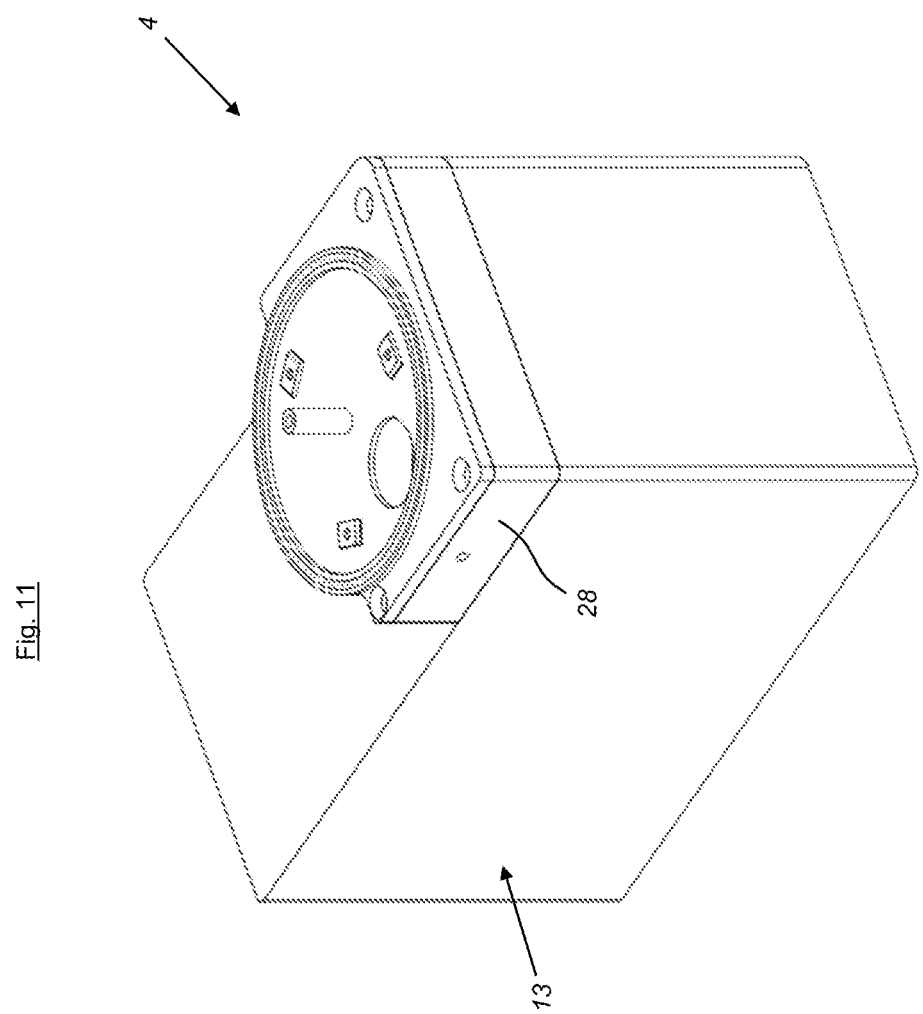
Figure 12:
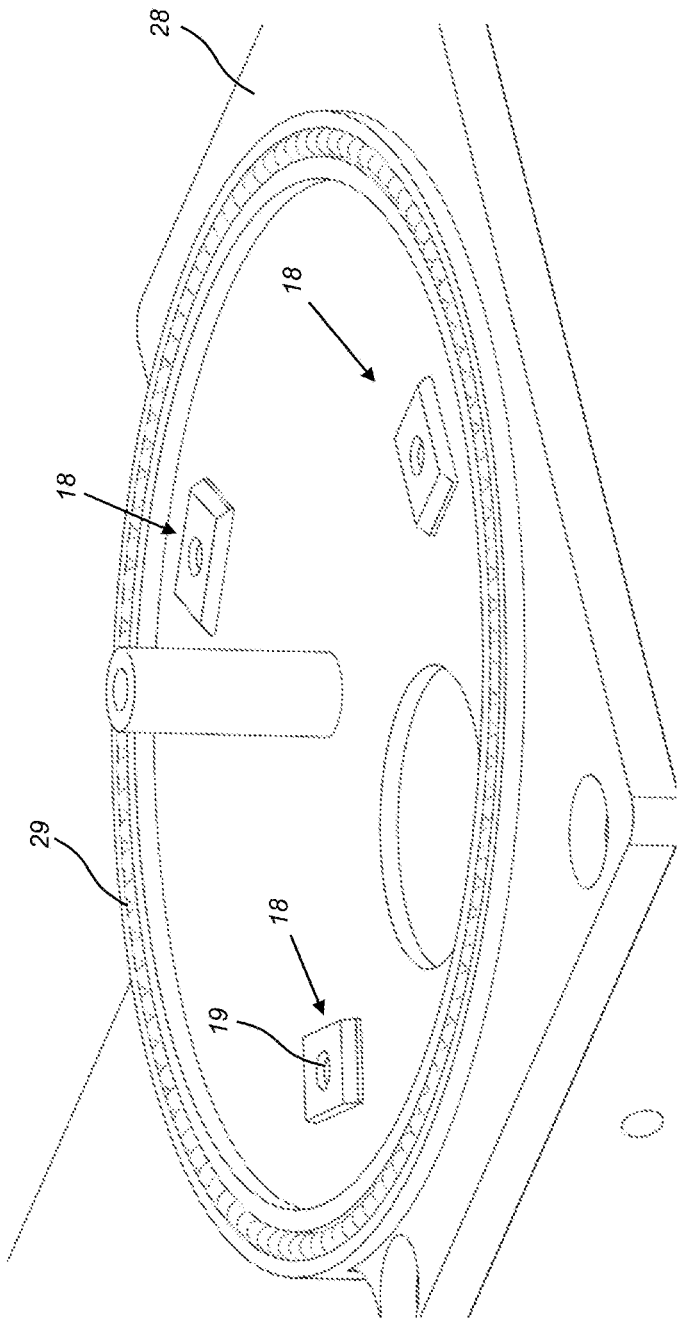

In the figures, the subject matter of the disclosure is shown schematically, with identical or similarly acting elements being mostly provided with the same reference signs. Therein shows:

FIG. 1 is a perspective view of the microscope according to an embodiment of the disclosure, FIG. 2 shows the microscope of FIG. 1 without an upper part of the housing wherein the optics module is arranged outside a replacement section, FIG. 3 is a top view on the optics module that is arranged outside the replacement section, FIG. 4 is a perspective view of the optics module that is arranged in a replacement section, FIG. 5 is a top view on the optics module that is arranged in the replacement section, FIG. 6 is a top view on the optics module being in the replacement section and moved along a predetermined distance, FIG. 7 is a schematic view of the microscope shown in FIG. 1, FIG. 8 is a perspective section view on the optics module, FIG. 9 is a perspective section view on the optics module in a state in which a house part was lifted, FIG. 10 is a perspective view on the objective and a first gear part, FIG. 11 is a perspective view on the optics module housing, FIG. 12 is an enlarged view of a part of the optics module housing shown in FIG. 11, FIG. 13 is a section view in which the position of the objectives is fixed by means of a fixing system, and FIG. 14 is a section view in which the position of the objectives is not fixed by means of the fixing system.

DETAILED DESCRIPTION

A microscope 1 shown in FIG. 1 comprises a housing 2 having a receiving portion 3. The receiving portion 3 is used to receive non-shown biological sample carriers. In particular, the receiving portion 3 is adapted to receive six biological sample carriers. Additionally, the microscope 1 comprises an optics module 4 that is arranged within an inner space 8 of the housing 2.

FIG. 2 shows a perspective view of the microscope shown in FIG. 1 without an upper part of the housing 2. As is evident from FIG. 2 the optics module 4 comprises several objectives 5a, 5b, 5c, namely a first objective 5a, a second objective 5b and a third objective 5c. The first objective 5a is arranged in the observation position. The remaining objectives 5b, 5c are arranged in a storage position, respectively. The optics module 4 also comprises an illumination system 6 for illuminating at least one biological system and an acquiring system 7 for acquiring light coming from at least one biological sample. Both system are arranged in an optics module housing 13 and are shown in FIGS. 7 through 9.

The optics module 4 is moveable relative to the housing 2. In particular, the optics module 4 is moveable in two directions x, y. By moving the optics module 4 along at least one of the directions x, y all components of the optics module 4 are moved. However, the optics module 4 is not configured to be moved in a third direction z. The directions refer to a Cartesian coordinate system with axes extending in x, y, z directions.

The microscope 1 comprises a replacement system 9 that is configured to replace the first objective 5a by one of the two other objectives 5b, 5c by means of moving the optics module 4 relative to the housing 2. In FIG. 2 the optics module 4 is arranged outside of a replacement section 12 of the inner space 8. That means, in said position the first objective 5a being in the observation position cannot be replaced by one of the other objectives 5b, 5c.

The replacement system 9 comprises a first gear part 10 and a second gear part 11. The first gear part 11 is a gear wheel and the second gear part 11 is a rack. The objectives 5a, 5b, 5c are fixedly connected with the first gear part 10. The first gear part 10 is connected with the optics module housing 13 such that the first gear part 10 moves together with the optics module 4 when the optics module 4 is moved. Additionally, the first gear part 10 can rotate relative to the optics module housing 13 as is discussed below. The rack 11 is arranged on a housing wall 14 and extends along a dimension y.

FIG. 3 shows a top view on the optics module 4 that is arranged outside the replacement section 12. As is evident from FIG. 3 the first gear part 10 is not engaged with the second gear part 11. That means, the teeth of the gear wheel are not engaged with the teeth of the rack.

FIG. 4 and FIG. 5 show a state of the optics module 4 in which the optics module 4 is arranged in the replacement section 12 of the inner space 8. FIG. 4 shows a perspective view of the optics module that is arranged in a replacement section 12 and FIG. 5 shows a top view on the optics module 4 that is arranged in the replacement section 12. In said arrangement the first gear part 10 is engaged with the second gear part 11. In particular, a particular of the teeth is in engagement with a part of the teeth of the rack 11. For replacing the first objective 5a by the second objective 5b the optics module 4 is moved along the direction y along a predetermined distance.

FIG. 6 shows the state of the optics module 4 after it is moved along the direction y. In particular, FIG. 6 shows a top view on the optics module 4 being in the replacement section 12 and moved along a predetermined distance from the position shown in FIG. 5. Due to the engagement of the first gear part 10 and the second gear part 11 the first gear part 10 rotates along the rotation axis R shown in FIG. 4 when the optics module 4 is moved along direction y. Due to rotation of the first gear part 10 the first objective 5a is moved from the observation position into a storage position. The third objective 5c is moved from a storage position into the observation position. The second objective 5b was moved from a storage position to another storage position. At the end of the movement of the optics module 4, the first objective 5a was replaced by the third objective 5c.

FIGS. 5 and 6 shows also axis for guiding the movement of the optics module 4. The axis are arranged so that the optics module 4 can be moved along a plane that extends in x and y direction.

FIG. 7 shows a schematic view of the microscope 1 shown in FIG. 1. In particular, FIG. 7 shows a sample carrier that is arranged in the receiving portion 3. The sample carrier is a substrate and holds a biological sample 27 that is schematically illustrated in FIG. 7. The illumination system 6 and the acquisition system 7 are arranged within the optics module housing 13.

In the present case, the illumination system 4 has two light sources 30. However, the number of light sources is not limited to two light sources 30. Downstream of each of the two light sources 30 is a collimating optics 31, such as a collimating lens. In addition, each of the collimating optics 30 is preceded by a further filter 26. The further filter is an excitation filer, respectively. The two illumination light beams are combined in a beam converging optical system 32 to form an illumination light 25. The illumination light 25 is deflected 90° by a deflection device 33, such as a mirror, for example a semi-transparent mirror or a wavelength selective mirror. The illumination light 25 exits the optics module 4 and the objective and exposing the biological sample 27.

The acquisition system 7 has an image sensor 23 for receiving acquisition light. The acquisition light corresponds to the light emitted from the biological sample 27 after being exposed to the illumination light 25. The image sensor 23 is preceded by a tube lens 34, a steering optic 35, and a filter 24, in particular an emission filter.

The optics module 4 also includes a mirror 36. The mirror 36 is configured to redirect the acquisition light 37 received through the objective toward the image sensor 23.

The microscope 1 comprises a drive device 21 that is used to drive the optics module 4 along the directions x, y. The two directions x, y define a plane that has a constant distance in z direction to another plane extending in x and y direction and comprising the biological sample 27. That means, the distance between the objectives 5a, 5b, 5c in z direction does not change when the optics module 4 is moved along the directions x, y. Additionally, the microscope 1 comprises a control unit 15. The control unit 15 is used to control the movement of the optics module 4. Furthermore, the control unit 15 controls the observation process.

FIG. 8 shows a perspective section view on the optics module 4 in a state in which the objectives are not moved along the direction z. The optics module 4 comprises a further drive device 22. The further drive device 22 is coupled with a house part 28 of the optics module housing 13. The first gear part 10 is connected with the house part 28. The further drive device 22 is configured to move the house part 28 along the direction z. FIG. 9 shows a perspective section view on the optics module 4 in a state in which the house part 28 was lifted by the further drive device 22. As is evident from FIG. 9 the house part 28 is lifted from the remaining optics module housing.

FIG. 10 shows a perspective view on the objective and a first gear part 10 from below and FIG. 11 shows a perspective view on the optics module housing 13. FIG. 12 shows an increased portion of the optics module housing 13 shown in FIG. 11. All figures show parts of a fixation system 16. The fixation system 16 comprises engagement elements 17 and receiving elements 18. The engagement elements 17 protrude from a lower side of the first gear part 10 towards the optics module housing 13. The lower side of the first gear part 10 faces the optics module housing 13. The engagement element 17 is designed as balls. The fixation system 16 comprises three engagement elements 17 that are arranged spaced from each other along a circumferential direction of the first gear part 10.

The receiving element 18 protrudes from the optics module housing 13 in a direction towards the first gear part 10. The receiving element 18 comprises a cavity 19 for receiving the engagement element 17. The fixations system comprises three receiving elements 18 that are arranged spaced from each other along the circumferential direction of the optics module housing 13.

From FIG. 12 it is evident that a bearing 29 is arranged on the optics module housing 13. The bearing 29 enables that the first gear part 10 can be rotated relative to the optics module housing 13, in particular relative to the house part 28.

FIG. 13 shows a section view in which the position of the objectives is fixed by means of the fixing system 16. In said case the engagement element 17 is arranged in the cavity 19 of the receiving element 18. The engagement element 17 is partially arranged in a recess 20 of the first gear part 10. A spring is also arranged in the 20. The springs acts on the engagement element 17 such that it is pressed into the cavity 19. FIG. 14 shows a section view in which the position of the objectives is not fixed by means of the fixing system. In said case the engagement element 17 is not arranged in the cavity 19.

REFERENCE SIGNS 1 microscope
2 housing
3 receiving portion
4 optics module
5a first objective
5b second objective
5c third objective
6 illumination system
7 acquiring system
8 inner space
9 replacement system
10 first gear part
11 second gear part
12 replacement section
13 optics module housing
14 housing wall
15 control unit
16 fixation system
17 engagement element
18 receiving element
19 cavity
20 recess
21 drive device
22 further drive device
23 image sensor
24 filter
25 illumination light
26 further filter
27 biological sample
28 housing part
29 bearing
30 light source
31 collimating optics
32 converging optical system
33 deflection device
34 tube lens
35 steering optic
36 mirror
37 acquisition light
R rotation axis

What is claimed is:

1. A microscope (1) comprising:
a housing (2) comprising an inner space (8) and a receiving portion (3) for receiving at least one biological sample (27);
an optics module (4) comprising a plurality of objectives (5a, 5b, 5c), an illumination system (6) for illuminating the at least one biological sample (27), and an acquiring system (7) for acquiring light coming from the at least one biological sample (27), wherein the optics module (4) is arranged in the inner space (8) of the housing (2), and wherein the plurality of objectives (5a, 5b, 5c), the illumination system (6), and the acquiring system (7) move with the optics module (4) as a whole relative to the housing (2) and/or the housing (2) moves relative to the plurality of objectives (5a, 5b, 5c), the illumination system (6), and the acquiring system (7) of the optics module (4) as a whole; and
a replacement system (9) for replacing one of the plurality of objectives (5a, 5b, 5c) with another of the plurality of objectives (5a, 5b, 5c), wherein the replacement system (9) is configured to replace the one objective with the other objective as a result of the optics module (4) being moved relative to the housing (2) and/or the housing (2) being moved relative to the optics module (4);

wherein the plurality of objectives (5a, 5b, 5c) are arranged such that during the replacement the one objective is repositioned from an observation position to a storage position and the other objective is repositioned to the observation position.

2. The microscope (1) according to claim 1, wherein the inner space (8) of the housing (2) comprises a predetermined replacement section (12) within which at least a portion of the optics module (4) must be moved to operate the replacement system (9), and wherein movement of the optics module (4) relative to the housing (2) while the portion of the optics module (4) is not within the predetermined replacement section (12) does not operate the replacement system (9).

3. The microscope (1) according to claim 2, wherein the replacement system (9) comprises a first gear part (10) mounted on the optics module (4) and a second gear part (11) mounted on the housing (2).

4. The microscope (1) according to claim 3, wherein the first gear part (10) is a gear wheel and the second gear part (11) is a rack.

5. The microscope (1) according claim 3, wherein the first gear part (10) and the second gear part (11) are engaged with each other by movement of the portion of the optics module (4) into the predetermined replacement section (12), and the first gear part (10) and the second gear part (11) are not engaged with each other when the portion of the optics module (4) is not within the predetermined replacement section (12).

6. The microscope (1) according to claim 5, wherein the optics module (4) is movable in a movement plane (x-y) relative to the housing (2), the optics module (4) includes an optics module housing (13), the first gear part (10) is mounted on the optics module (4) such that the first gear part (10) is rotatable about a rotation axis (R) relative to the optics module housing (13), the plurality of objectives (5a, 5b, 5c) of the optics module (4) are arranged to rotate with the first gear part (10) about the rotation axis (R), and the rotation axis (R) is perpendicular to the movement plane (x-y) of the optics module (4).

7. The microscope (1) according to claim 2, further comprising a drive device (21) operable to move the optics module (4) relative to the housing (2) and a control unit (15) connected to the drive device (21), wherein the control unit (15) is configured to control the movement of the optics module (4) relative to the housing (2).

8. The microscope (1) according to claim 7, wherein the control unit (15) is configured to cause the optics module (4) to be moved to bring the portion of the optics module (4) within the predetermined replacement section (12) to operate the replacement system (9), and is configured to cause the optics module (4) to be moved to bring the portion of the optics module (4) out of the predetermined replacement section (12) to cease operating the replacement system (9).

9. The microscope (1) according to claim 7, wherein the control unit (15) is configured to cause the optics module (4) to be moved a predetermined distance while the portion of the optics module (4) is within the predetermined replacement section (12) to replace the one objective with the other objective.

10. The microscope (1) according to claim 6, further comprising a fixation system (16) for keeping first gear part (10) in a set position relative to the optics module housing (13).

11. The microscope (1) according to claim 10, wherein the fixation system (16) comprises at least one of (i) a form-fit connection between the first gear part (10) and the optics module housing (13), and (ii) a magnetic connection between the first gear part (10) and the optics module housing (13).

12. The microscope (1) according to claim 10, wherein the fixation system (16) comprises at least one engagement element (17) and at least one receiving element (18) comprising a cavity (19), wherein the first gear part (10) is kept in the set position when the at least one engagement element (17) is arranged in the cavity (19) of the at least one receiving element (18).

13. The microscope (1) according to claim 12, wherein a plurality of engagement elements (17) and a corresponding plurality of receiving elements (18) are arranged at spaced angular intervals about the rotational axis (R).

14. The microscope (1) according to claim 13, wherein the plurality of engagement elements (17) are arranged on the first gear part (10) and the corresponding plurality of receiving elements (18) are arranged on the optics module housing (13).

15. The microscope (1) according to claim 1, further comprising a detection device for detecting which of the plurality of objectives (5a, 5b, 5c) is in the observation position.

16. The microscope (1) according to claim 6, further comprising
   a. a further drive device (22) for moving the plurality of objectives (5a, 5b, 5c) along an axis (z) perpendicular to the movement plane (x-y) of the optics module (4) or
   b. a further drive device (22) for moving the plurality of objectives (5a, 5b, 5c) along an axis (z) perpendicular to the movement plane (x-y) of the optics module (4) and the further drive device (22) moves a housing part (28) of the optics module housing (13) along the axis (z) relative to other housing parts of the optics module housing (13).

17. The microscope (1) according to claim 1, wherein
   a. the optics module (4) comprises the acquiring system (7), and the acquiring system (7) comprises at least one of (i) an image sensor (23) and (ii) a filter (24) and/or wherein
   b. the optics module (4) comprises the illumination system (6), and the illumination system comprises at least one of (i) a light source (30) and (ii) a filter (26) and/or wherein
   c. the optics module (4) comprises the illumination system (6) and the acquiring system (7), and wherein an output illumination light (25) from the illumination system (6) and an acquisition light (37) received by the acquiring system (7) are coaxial with each other through the one objective in the observation position and/or wherein
   d. the microscope (1) is an inverted microscope.

18. A method for replacing one objective of a microscope (1) with another objective of the microscope (1), the method comprising:
   moving an optics module (4) of the microscope (1) relative to a housing (2) of the microscope and/or moving the housing (2) relative to the optics module (4);

wherein the optics module (4) is arranged in an inner space (8) of the housing (2) and the optics module (4) comprises the one objective, the other objective, an illumination system (6) for illuminating at least one biological sample (27), and an acquiring system (7) for acquiring light coming from the at least one biological sample (27);

wherein the plurality of objectives (5*a*, 5*b*, 5*c*), the illumination system (6), and the acquiring system (7) move with the optics module (4) as a whole relative to the housing (2) and/or the housing (2) moves relative to the plurality of objectives (5*a*, 5*b*, 5*c*), the illumination system (6), and the acquiring system (7) of the optics module (4) as a whole.

19. The method according to claim 18,
a. further comprising positioning at least a portion of the optics module (4) within a replacement section (12) of the inner space (8) of the housing (2) before the step of moving and/or
b. wherein the step of moving comprises moving the optics module (4) a predetermined distance relative to the housing (2) while the portion of the optics module (4) is within the replacement section (12) of the inner space (8) and/or
c. wherein the step of positioning is performed after an observation process using the one objective is completed.

20. The method according to claim 18, wherein the microscope (1) is in an incubator for the at least one biological sample (27).

* * * * *